United States Patent
Shimomura et al.

(10) Patent No.: US 6,966,944 B2
(45) Date of Patent: Nov. 22, 2005

(54) ANTICURLING AGENT, INK JET INK, METHOD FOR INK JET RECORDING AND METHOD FOR REDUCING CURLING

(75) Inventors: Masako Shimomura, Kanagawa (JP); Hiromichi Noguchi, Tokyo (JP); Kenji Shinjo, Kanagawa (JP); Yutaka Kurabayashi, Tokyo (JP); Hirofumi Ichinose, Tokyo (JP); Minako Kawabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/874,266

(22) Filed: Jun. 24, 2004

(65) Prior Publication Data
US 2004/0231556 A1 Nov. 25, 2004

Related U.S. Application Data

(63) Continuation of application No. PCT/JP03/16713, filed on Dec. 25, 2003.

(30) Foreign Application Priority Data

Dec. 26, 2002 (JP) .................................. 2002-378250
Dec. 26, 2002 (JP) .................................. 2002-378256

(51) Int. Cl.⁷ ............................................. C09D 11/02
(52) U.S. Cl. .................................. 106/31.43; 106/31.75
(58) Field of Search ........................ 106/31.43, 31.75; 562/556, 553; 564/156, 152, 160, 192, 199, 203

(56) References Cited

U.S. PATENT DOCUMENTS

| | | | | |
|---|---|---|---|---|
| 2,225,604 | A | * 12/1940 | Lubs et al. | 106/31.43 |
| 4,329,363 | A | * 5/1982 | Dorn et al. | 564/162 |
| H1043 | H | * 4/1992 | Speranza et al. | 564/156 |
| 5,131,949 | A | 7/1992 | Tochihara et al. | 106/31.43 |
| 5,160,372 | A | * 11/1992 | Matrick | 106/31.43 |
| 5,173,112 | A | 12/1992 | Matrick et al. | 106/31.43 |
| 5,356,464 | A | 10/1994 | Hickman et al. | 106/31.43 |
| 5,369,108 | A | * 11/1994 | Breslow et al. | 564/160 |
| 5,574,184 | A | * 11/1996 | Wu et al. | 562/556 |
| 5,686,508 | A | 11/1997 | Shimomura et al. | 523/161 |
| 5,693,126 | A | 12/1997 | Ito | 106/31.43 |
| 5,693,129 | A | * 12/1997 | Lin | 106/31.43 |
| 5,709,737 | A | * 1/1998 | Malhotra et al. | 106/31.43 |
| 6,194,613 | B1 | * 2/2001 | Weihrauch et al. | 564/135 |
| 6,297,400 | B1 | * 10/2001 | Deline et al. | 564/160 |
| 6,342,576 | B1 | * 1/2002 | Wenning | 564/160 |
| 6,682,590 | B2 | * 1/2004 | Omatsu et al. | 106/31.43 |
| 2004/0207701 | A1 | * 10/2004 | Iinuma | 106/31.47 |

FOREIGN PATENT DOCUMENTS

| | | |
|---|---|---|
| DE | 43 10 534 A1 | 10/1993 |
| EP | 0 447 784 A1 | 9/1991 |
| EP | 0 643 113 A1 | 3/1995 |
| EP | 0 719 845 A2 | 7/1996 |
| EP | 0 780 450 A2 | 6/1997 |
| JP | 57-10660 A | 1/1982 |
| JP | 58-23992 A | 2/1983 |
| JP | 58-23993 A | 2/1983 |
| JP | 58-23995 | 2/1983 |
| JP | 4-211466 A | 8/1992 |
| JP | 6-41484 A | 2/1994 |
| JP | 6-157955 A | 6/1994 |
| JP | 6-240189 | 8/1994 |
| JP | 7-268261 | 10/1995 |
| JP | 8-231911 A | 9/1996 |
| JP | 9-176538 A | 7/1997 |
| JP | 2004209762 | * 7/2004 |
| JP | 2004210906 | * 7/2004 |
| JP | 2004210914 | * 7/2004 |

* cited by examiner

*Primary Examiner*—Helene Klemanski
(74) *Attorney, Agent, or Firm*—Fitzpatrick, Cella, Harper & Scinto

(57) ABSTRACT

The present invention provides an anti-curl agent containing an amide compound of specific structure and molecular weight, an ink jet ink containing the amide compound, a method for ink jet recording to form images by ejecting the ink, and a method for reducing curl of recording media using the ink. The anti-curl agent of the present invention can reduce shape changes of a printed paper with a lapse of time, i.e., the curl phenomenon, tending to occur in particular with a plain paper printed over the entire surface, without deteriorating image quality.

5 Claims, 2 Drawing Sheets

ANTICURLING AGENT, INK JET INK, METHOD FOR INK JET RECORDING AND METHOD FOR REDUCING CURLING

This application is a continuation of International Application No. PCT/JP03/16713 filed on Dec. 25, 2003 which claims the benefit of Japanese Patent Application Nos. 2002-378250 filed on Dec. 26, 2002 and 2002-378256 filed on Dec. 26, 2002.

BACKGROUND OF THE INVENTION

1. Field of the Invention

The present invention relates to an anti-curl agent, an ink jet ink containing the anti-curl agent, a method for ink jet recording to form images by ejecting the ink, and a method for reducing curl of the recording medium using the ink.

2. Related Background Art

Ink jet recording method ejects ink droplets directly onto a water-absorptive medium like paper, to which the ink is attached to form images thereon. Because the ink-jet printer is compact and low cost, it is widely used as the output machine of the personal computers at home and offices. Moreover, an ink jet recording method is suitably applicable for recording an image with high resolution and quality at a high speed.

The ink for this type of recording method generally comprises water as a major component, a colorant, and a polar solvent such as glycerin to prevent ink deposition to the fine nozzles. Such an ink has advantages of being odorless and having a high flash point. However, when a large quantity of the ink is applied to a recording medium to form an image with the colorant in the ink, a large quantity of water may be absorbed by the recording medium because the component of the ink is mostly water. As a result, the printing speed sometimes depends on the penetration speed of the ink into the recording medium.

On the other hand, when plain paper is used as a recording medium, the shape may change after absorbing a large quantity of water. There are two general categories in these changes; one is cockling and the other curl. The curl phenomenon means shift of the paper edge towards the center of the printed side or the backside. Curl to the backside is referred to as reverse curl. Curl may occur immediately after printing or may appear with a lapse of time. Eventually the paper may become cylindrical in an extreme case, and storage of the recording media becomes very inconvenient.

Some attempts have been made to solve these problems. For example, Japanese Unexamined Patent Publication No. H06-240189 discloses a technique to reduce the curl phenomenon by adding 4 to 20% by mass of sugar to the ink.

Japanese Unexamined Patent Publication No. H06-157955 discloses the compounds having multiple hydroxyl groups as the anti-curl agent. These compounds include diols of 3 to 11 carbon atoms and ethylene oxide or polyoxyalkylene derivatives thereof, ethylene oxide or polyoxyalkylene derivatives of glycerin, pyranosides and derivatives thereof, and polyoxyalkylene derivatives of aliphatic polyamine.

Japanese Unexamined Patent Publication No. H09-176538 discloses an anti-curl agent of a carboxylic acid amide, e.g., acetamide, propionamide, isobutylamide or hexanamide; alkylurea of up to 6 carbon atoms, e.g., butylurea, 1,3-dimethylurea, ethylurea, propylurea or 1,3-diethylurea; or nitrogen-containing cyclic compound, e.g., tetrahydropyrimidone or imidazolidinone, to be incorporated in an ink at least 10% by mass or more.

SUMMARY OF THE INVENTION

The inventors of the present invention have found out that the ink compositions disclosed by the above-described prior art are not desirable. The ink disclosed by JP H06-240189 may have deteriorated ejectability, when used for thermal ink jet printing, because it tends to cause kogation on the heater. The ink disclosed by JP H06-157955 shows insufficient anti-curl effect. The anti-curl agent disclosed by JP H09-176538 may be easily hydrolyzed into an alkylamine.

Therefore, there are still demands for preventing curl of plain paper more effectively after images are printed thereon with an aqueous ink jet ink at a high recording density (i.e., with a large quantity of ink per unit area).

The object of the present invention is to provide an anti-curl agent that can reduce shape changes of a printed paper (curl phenomenon) which tends to occur in particular when a plain paper is printed over the entire surface without deteriorating image quality. Another object is to provide an ink jet ink containing the anti-curl agent. Still another object is to provide a method for ink jet recording to form images by ejecting the ink. It is still another object to provide a method for reducing curl of recording media using the ink.

The present invention relates to an anti-curl agent for the recording medium, comprising an amide compound which has a structure selected from the group consisting of the general formulae (a), (b) and (c) described below, and a molecular weight less than 1000:

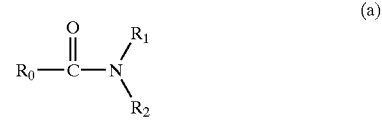
(a)

(wherein, $R_0$ is a linear or branched alkanol group of 2 to 4 carbon atoms, $-(CH_2)_{n1}COOH$ (n1 is 2 or 3), $-(CH_2)_{n2}SO_3Na$ (n2 is 2 or 3) or $-(CH_2)_{n3}SO_3H$ (n3 is 2 or 3); and $R_1$ and $R_2$ are each independently a hydrogen atom or a linear or branched alkanol group of 2 to 4 carbon atoms, where $R_1$ and $R_2$ are not a hydrogen atom simultaneously);

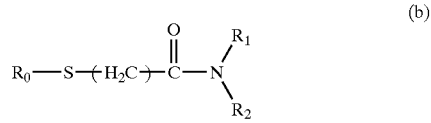
(b)

(wherein, $R_0$ is a linear or branched alkanol group of 2 to 4 carbon atoms, $-(CH_2)_{m1}COOH$ (m1 is 2 or 3), $-(CH_2)_{m2}SO_3Na$ (m2 is 2 or 3) or $-(CH_2)_{m3}SO_3H$ (m3 is 2 or 3); and $R_1$ and $R_2$ are each independently a hydrogen atom or a linear or branched alkanol group of 2 to 4 carbon atoms, substituted with a hydrogen atom or hydroxyl group, where $R_1$ and $R_2$ are not a hydrogen atom simultaneously); and

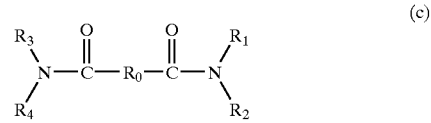
(c)

(wherein, $R_0$ is a phenylene, ethylene, propylene, butylene or cyclohexylene group; and $R_1$ to $R_4$ are each independently a hydrogen atom, a linear or branched alkanol group of 2 to 4 carbon atoms or —$(CH_2CH_2O)_n$H (n is an integer of 1 to 5), where $R_1$ and $R_2$ are not a hydrogen atom simultaneously, and $R_3$ and $R_4$ are not a hydrogen atom simultaneously.

The present invention also relates to an ink-jet ink containing a colorant and an aqueous medium, the ink having an amide compound which has a structure selected from the group consisting of the general formulae (a), (b) and (c) described above, having a molecular weight below 1000.

The present invention also relates to a method of ink jet recording, comprising at least a step of discharging the above ink by an ink jet method.

The present invention also relates to a method for reducing curl of a recording medium by applying the above ink thereto by an ink jet recording method.

The anti-curl agent of the present invention, even when an image is formed with an aqueous ink jet ink on a plain paper, sufficiently prevents the curl phenomenon without lowering the quality of image, and enables easy handling of the recorded matter.

DETAILED DESCRIPTION OF THE INVENTION

Figure 1:
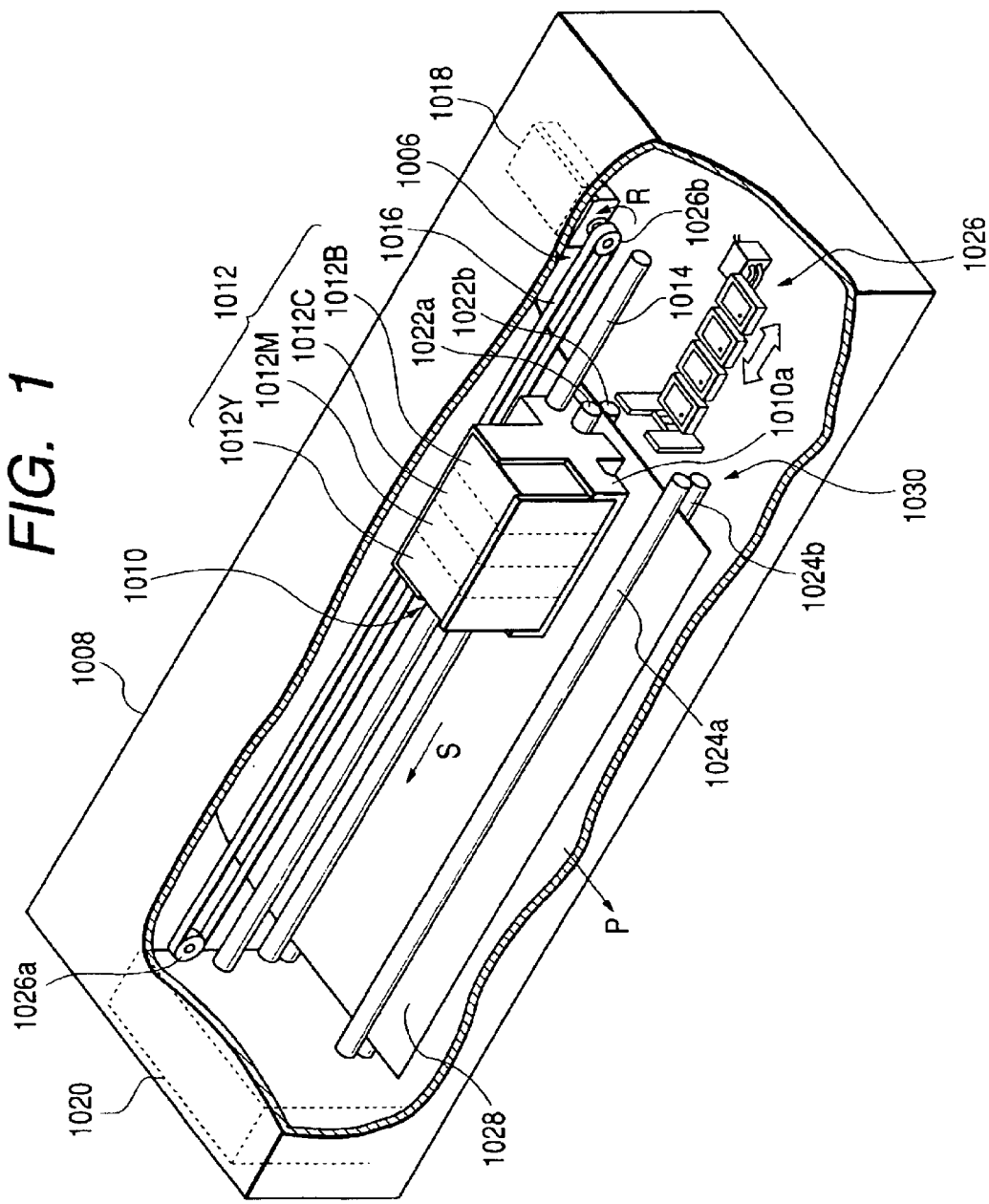
FIG. 1 is an oblique view which outlines a major section of one embodiment of an ink jet printer.

First, the amide compound having an anti-curl effect for the present invention and the anti-curl effect of the ink-jet ink containing the compound are described.

The inventors of the present invention considered that the curl phenomenon of a recording medium occurred because the cellulose fibers constituting the recording medium swelled when hydrogen bonds were formed between water and hydroxyl groups of cellulose and then shrank as the water evaporates. The inventors predicted that the curl phenomenon of a recording medium could be well prevented by incorporating in an ink a compound having two or more, preferably three or more groups in the molecule which could bind to cellulose via hydrogen bonding better than the water molecules could. Thus the present invention was made.

The amide compound represented by one of the general formulae (a) to (c) is considered to exhibit an excellent anti-curl effect, because the proton in the hydroxyl group of alkanol group, the proton in the terminal hydroxyl group of ethylene oxide group, or the terminal proton of carboxyl or sulfone group binds to oxygen of the hydroxyl group of cellulose through hydrogen bonding, to crosslink the fibers, where the alkanol, ethylene oxide, carboxyl or sulfone group is directly linked to the amide bond. Moreover, nucleophilicity of the nitrogen atom in the amide bond works to strengthen the hydrogen bond formed between the cellulose molecules. As a result, the synergistic effect of the proton and the nitrogen atom is considered to further improve the anti-curl effect of the amide compound.

Still more, the amide compound containing two or more amide bonds in the molecular structure can exhibit a higher anti-curl effect by having at least one alkanol or ethylene oxide group for each nitrogen atom.

On the other hand, when the amide compound contains only one nitrogen atom, which forms an amide bond with carbonyl group in the molecular structure, it cannot exhibit a sufficient anti-curl effect unless at least one alkanol or ethylene oxide group is directly bonded to the nitrogen atom and an alkanol or ethylene oxide group is simultaneously bonded to the carbon atom of the carbonyl group constituting the amide bond. For still higher anti-curl effect, it is preferable for the amide compound to have two alkanol or ethylene oxide groups each directly bonded to the nitrogen atom constituting the amide bond and one alkanol or ethylene oxide group directly bonded to the carbon atom in the amide bond, in order to crosslink the cellulose fibers with three hydrogen bonds.

The mechanism of the present invention is considered applicable to compounds other than the amide compounds of the present invention. In other words, a compound having an urethane or urea bond can work as an anti-curl agent by the nucleophilic function of the nitrogen atom in the bond, when 2 to 4 alkyl alcohol molecules of 4 or less carbon atoms are directly bonded to the urethane or urea bond. Compounds having such a urea bond include 1,3-bis($\beta$-hydroxyethyl) urea, 1-$\alpha$-hydroxypropyl-3-($\beta$-hydroxyethyl)urea, 1,1-bis ($\beta$-hydroxyethyl)-3-($\beta$-hydroxyethyl)urea and 1,1-bis($\gamma$-hydroxypropyl)-3-($\beta$-hydroxyethyl)urea, as disclosed by Japanese Patent No. 3,412,857. Compounds having such a urethane bond include hexamethylenediamine to which an isocyanate derivative is added, as disclosed in Japanese Unexamined Patent Publication No. H07-268261. The amide compound for the present invention and the above-described known compounds have two or more nitrogen-containing atomic groups (urea, urethane or amide bond), and exhibit an excellent anti-curl effect probably resulting from a strong agglomerating force between the atomic groups themselves, or between the atomic groups and hydroxyl group in the cellulose molecule.

On the other hand, it is considered that urea is too small to cross-link the cellulose molecules and is considered to be difficult to crosslink two or more cellulose fibers, although it has amide bond, and actually, it does not exhibit anti-curl effect. When methanol is the alkanol group which bonds directly to the amide bond, the compound becomes so reactive that the storage stability of the ink becomes deteriorated.

Alkanol groups having 2 to 4 carbon atoms are preferable because the nitrogen atom in the amide bond preferably has a certain nucleophilicity, while alkanol groups having more than 4 carbon atoms are not preferable because strength of hydrogen bonding with cellulose fiber owing to the nucleophilic function of the nitrogen will decrease. The most preferable alkanol group is alkanol of two carbon atoms, i.e., ethanol.

When ethylene oxide is the functional group directly bonded to the nitrogen atom of the amide bond, it is preferably a polymer of 1 to 5 ethylene oxide molecules. Polymers longer than 5 ethylene oxide units are not preferable because insufficient nucleophilicity of the nitrogen atom results in low anti-curl effect and the high viscosity of the compound increases ink viscosity resulting in deteriorated ink ejectability, in particular, after a certain period of suspension of ejection.

The amide compound for the anti-curl agent of the present invention has a molecular weight below 1000. An amide compound having molecular weight of 1000 or more is not preferable, because the ink becomes so viscous that flowability of the ink is lost and that evaporation of water and/or the low-boiling-point solvent particularly occurs at the meniscus on the nozzle, resulting in clogging of the nozzle.

Therefore, the anti-curl agent for the present invention contains an amide compound which has a structure selected from the group consisting of the general formulae (a), (b) and (c) described above, with alkanol or ethylene oxide group directly bonded to the amide bond, and a molecular weight below 1000.

In the general formula (a), $R_0$ is a linear or branched alkanol group of 2 to 4 carbon atoms, —$(CH_2)_{n1}COOH$ (n1 is 2 or 3), —$(CH_2)_{n2}SO_3Na$ (n2 is 2 or 3) or —$(CH_2)_{n3}SO_3H$ (n3 is 2 or 3). The preferable examples include —$CH_2CH_2OH$, $CH_2CH(CH_3)OH$, $CH_2CH_2CH_2CH_2OH$, —$CH_2CH_2CH(CH_3)OH$, $CH_2CH(CH_3)CHOH$, —$CH_2CH_2COOH$, —$CH_2CH_2CH_2COOH$, $CH_2CH(CH_3)COOH$, —$CH_2CH_2SO_3Na$, —$CH_2CH_2CH_2SO_3Na$, $CH_2CH(CH_3)SO_3Na$, —$CH_2CH(CH_3)SO_3H$, —$CH_2CH_2SO_3H$ and —$CH_2CH_2CH_2SO_3H$.

In the general formula (a), $R_1$ and $R_2$ are each independently a hydrogen atom or an alkanol group. The preferable alkanol groups for the present invention include —$CH_2CH_2OH$, —$CH_2CH_2CH_2OH$, —$CH_2CH_2CH_2CH_2OH$, —$(CH_2)CH(CH_3)OH$, —$CH_2CH_2CH(CH_3)OH$, —$CH_2CH(CH_3)CH_2OH$, —$CH(OH)CH_2CH_3$, —$CH(OH)CH_2CH_2CH_3$, —$CH_2C(CH_3)(OH)CH_3$, —$CH(OH)CH_3$, —$CH(CH_3)CH_2OH$, —$C(CH_3)_2OH$, —$CH_2CH(OH)CH_2CH_3$, —$CH(CH_3)CH_2CH_2OH$, —$CH(CH_3)CH(OH)CH_3$, —$C(CH_3)_2CH_2OH$, —$CH(OH)CH(CH_3)CH_3$ and —$C(OH)(CH_3)CH_2CH_3$.

In the general formula (b), $R_0$ is a linear or branched alkanol group of 2 to 4 carbon atoms, —$(CH_2)_{m1}COOH$ (m1 is 2 or 3), —$(CH_2)_{m2}SO_3Na$ (m2 is 2 or 3) or —$(CH_2)_{m3}SO_3H$ (m3 is 2 or 3). The preferable examples include —$CH_2CH_2OH$, $CH_2CH(CH_3)OH$, $CH_2CH_2CH_2CH_2OH$, —$CH_2CH_2CH(CH_3)OH$, $CH_2CH(CH_3)CHOH$, —$CH_2CH_2COOH$, —$CH_2CH_2CH_2COOH$, $CH_2CH(CH_3)COOH$, —$CH_2CH_2SO_3Na$, —$CH_2CH_2CH_2SO_3Na$, $CH_2CH(CH_3)SO_3Na$, —$CH_2CH(CH_3)SO_3H$, —$CH_2CH_2SO_3H$ and —$CH_2CH_2CH_2SO_3H$.

In the general formula (b), $R_1$ and $R_2$ are each independently a hydrogen atom or an alkanol group. The preferable alkanol groups for the present invention include —$CH_2CH_2OH$, —$CH_2CH_2CH_2OH$, —$CH_2CH_2CH_2CH_2OH$, —$(CH_2)CH(CH_3)OH$, —$CH_2CH_2CH(CH_3)OH$, —$CH_2CH(CH_3)CH_2OH$, —$CH(OH)CH_2CH_3$, —$CH(OH)CH_2CH_2CH_3$, —$CH_2C(CH_3)(OH)CH_3$, —$CH(OH)CH_3$, —$CH(CH_3)CH_2OH$, —$C(CH_3)_2OH$, —$CH_2CH(OH)CH_2CH_3$, —$CH(CH_3)CH_2CH_2OH$, —$CH(CH_3)CH(OH)CH_3$, —$C(CH_3)_2CH_2OH$, —$CH(OH)CH(CH_3)CH_3$ and —$C(OH)(CH_3)CH_2CH_3$.

In the general formula (c), $R_0$ is phenylene, ethylene, propylene, butylene or cyclohexylene group, of which phenylene, propylene, butylene and cyclohexylene group are more preferable. When $R_0$ is phenylene or cyclohexylene group, it may be substituted at any of ortho, meta or para position.

In the general formula (c), the four functional groups of $R_1$ to $R_4$ are each independently a hydrogen atom, a linear or branched alkanol group of 2 to 4 carbon atoms or —$(CH_2CH_2O)_nH$ (n is an integer of 1 to 5), where $R_1$ and $R_2$ are not a hydrogen atom simultaneously, and $R_3$ and $R_4$ are not a hydrogen atom simultaneously. The preferable alkanol groups include —$CH_2CH_2OH$, —$CH_2CH_2CH_2OH$, —$CH_2CH_2CH_2CH_2OH$, —$(CH_2)CH(CH_3)OH$, —$CH_2CH_2CH(CH_3)OH$, —$CH_2CH(CH_3)CH_2OH$, —$CH(OH)CH_2CH_3$, —$CH(OH)CH_2CH_2CH_3$, —$CH_2C(CH_3)(OH)CH_3$, —$CH(OH)CH_3$, —$CH(CH_3)CH_2OH$, —$C(CH_3)_2OH$, —$CH_2CH(OH)CH_2CH_3$, —$CH(CH_3)CH_2CH_2OH$, —$CH(CH_3)CH(OH)CH_3$, —$C(CH_3)_2CH_2OH$, —$CH(OH)CH(CH_3)CH_3$ and —$C(OH)(CH_3)CH_2CH_3$. The preferable $(CH_2CH_2O)_nH$ (n is an integer of 1 to 5) include —$CH_2CH_2OH$, —$(CH_2CH_2O)_2H$, —$(CH_2CH_2O)_3H$, —$(CH_2CH_2O)_4H$ and —$(CH_2CH_2O)_5H$. Each of $R_1$ to $R_4$ is preferably a hydrogen atom, or a linear or branched alkanol group of 2 to 4 carbon atoms. When $R_1$ to $R_4$ are each —$(CH_2CH_2O)_nH$ (n is an integer of 1 to 5), it is preferable that $R_1$ and $R_3$ are each —$(CH_2CH_2O)_nH$ (n is an integer of 2 to 5), and $R_2$ and $R_4$ are each independently a hydrogen atom or —$(CH_2CH_2O)_nH$ (n is an integer of 1 to 5).

Table 1 gives the particularly preferable examples of amide compounds.

TABLE 1

| Examples of amide compounds No. | General formula | $R_0$ | $R_1$ | $R_2$ | $R_3$ | $R_4$ |
|---|---|---|---|---|---|---|
| 1 | (a) | —$CH_2CH_2COOH$ | —$CH_2CH_2OH$ | —$CH_2CH_2OH$ | — | — |
| 2 | (b)n = 1 | —$CH_2CH_2OH$ | —$CH_2CH_2OH$ | —$CH_2CH_2OH$ | — | — |
| 3 | (c) | Phenylene | —$CH_2CH_2OH$ | —$CH_2CH_2OH$ | —$CH_2CH_2OH$ | —$CH_2CH_2OH$ |
| 4 | (c) | Propylene | —$CH_2CH_2OH$ | —H | —$CH_2CH_2OH$ | —H |
| 5 | (c) | Butylene | —$CH_2CH_2OH$ | —H | —$CH_2CH_2OH$ | —H |
| 6 | (c) | Phenylene | —$(CH_2CH_2O)_2H$ | —H | —$(CH_2CH_2O)_2H$ | —H |
| 7 | (c) | Cyclohexylene | —$(CH_2CH_2O)_3H$ | —$(CH_2CH_2O)_3H$ | —$(CH_2CH_2O)_3H$ | —$(CH_2CH_2O)_3H$ |
| 8 | (c) | Phenylene | —$(CH_2CH_2O)_4H$ | —$(CH_2CH_2O)_4H$ | —$(CH_2CH_2O)_4H$ | —$(CH_2CH_2O)_4H$ |

The anti-curl agent of the present invention contains at least an amide compound described above and it may further contain a solvent selectable from a wide variety as required. For example, the anti-curl agent may be solely composed of the amide compound described above, or it may further contain any component of ink except for the colorant, e.g., water, solvents or additives. Preferably, the anti-curl agent of the present invention contains the above-described amide compound at 5 to 100% by mass based on the whole composition. When the anti-curl agent is used as a solution, in particular for underprinting for an ink as described later, the amide compound is preferably incorporated at 5 to 50% by mass.

Next, the preferred embodiments of the ink of the present invention for ink jet recording are described.

The ink of the present invention contains at least a colorant, an aqueous solvent and at least one of the above-described amide compounds. The present invention preferably contains the amide compound(s) at 3 to 30% by mass, particularly preferably 3 to 10%. At below 3%, the effect of the present invention may not be fully exhibited. At above 10%, on the other hand, the ink tends to have deteriorated ejectability because of excessive viscosity.

The preferred concentration of the above-described amide compound in the ink may vary with the type and the content of other components. The anti-curl effect tends to be hindered when a compound having OH group and a small number of carbon atoms, e.g., glycerin, ethylene glycol, diethylene glycol, ethyl alcohol or propyl alcohol is present in a large amount, although the reason is not fully understood.

Therefore, the ink preferably contains a compound having 6 or less carbon atoms and three or less OH groups at 10% by mass or less based on the whole ink composition. Polar solvents having no proton donating capacity, e.g., 2-pyrrolidone, N-methyl-2-pyrrolidone, sulfolane, dimethylsulfoxide or dimethylformamide, cause curl of the recording medium to a lesser extent than the polar solvent described above does, but curl tends to occur with a lapse of time. Moreover, the above solvent tends to dissolve materials constituting the ink jet head. Thus such a solvent is preferably incorporated at 10% by mass or less based on the whole ink composition, particularly preferably 5% by mass or less.

On the other hand, diols of 5 to 6 carbon atoms, e.g., 1,5-pentanediol, 1,2-pentanediol, 1,2-hexanediol, 1,6-hexanediol and 1,5-hexanediol, and ethylene glycols of 4 carbon atoms or more also exhibit a certain anti-curl effect, although not so effective as the amide compound in the present invention. Therefore, when one or more of diols of 5 to 6 carbon atoms and ethyleneglycols of 4 carbon atoms are used with the anti-curl agent of the present invention, the ink properties as the ink jet ink, such as anti-curl effect, nozzle restoration and solubility for dyes, are improved, In the present invention, the total amount of the amide compound and a solvent for preventing solidification of the ink and thereby nozzle clogging resulting from evaporation of the water component may be 10 to 50% by mass based on the total mass of the ink composition, particularly preferably 10 to 30%.

The colorant for the present invention is not specifically limited, and may be a dye or a pigment. Various dyes and pigments can be used for the present invention without causing problems. Dyes and pigments of orange, green, blue, dark yellow, gray and violet colors may be used, in addition to those of black, cyan, yellow and magenta colors.

Dyes for the present invention are preferably acidic dyes, basic dyes, direct dyes, food dyes, disperse dyes and reactive dyes. Such a dye or pigment is incorporated preferably at 0.01 to 10% by mass based on the whole ink composition. Also a pigment dispersion dispersed by a dispersant such as a resin or a surfactant, or a self-dispersing pigment subjected to surface-modification to have ionic properties on the surface, can be used in the present invention. The pigment particles should be sufficiently fine, because the ink composition where they are dispersed is ejected through a fine nozzle orifice in the ink jet head. They are preferably 50 to 500 nm in particle size, because excessively fine particles may deteriorate coloring power because of increased light transmittance.

The ink composition of the present invention may contain an inorganic pigment, e.g., silica, alumina or titania, depending on the use.

One of the preferable aqueous media for the present invention is water. Water is preferably incorporated at 10 to 90% by mass based on the whole ink composition, particularly preferably 30 to 80% by mass.

The ink of the present invention may contain a colorant, an aqueous medium and a solvent or surfactant conventionally known for ink jet inks.

Moreover, it may further contain a conventionally known anti-curl agent for ink jet ink as long as the remarkable effect of the present invention can be exhibited.

The additives useful for the present invention include a pH adjusting agent, e.g., inorganic alkali, alkanol amine, and organic and inorganic acid; a pH stabilizer (buffer), e.g., lithium acetate, ammonium acetate, ammonium sulfate and trishydroxyaminomethane; a surfactant for controlling the rate at which the ink is absorbed by a recording medium; a fungicide for inhibiting growth of fungi or the like in the ink during long time storage; a chelating agent, e.g., ethylenediamine tetraacetate, for capturing metal ions that have dissolved in the ink and may deposit on the heater and the orifice face of the head to deteriorate printing functions; and citric acid or the like which forms a complex with such metal ions.

Besides, in order to reduce bleeding in the boundary between the color ink and black ink, a black ink of the present invention and a color ink of the present invention further containing a polyvalent metal salt may be concomitantly used in the following manner to agglomerate the coloring material of the black ink and enhance fixation of the black ink: first the color ink is applied to the recording medium and then the black ink is applied to the same region (underprinting), or first the black ink is applied to the recording medium and then the color ink is applied to the same region (overprinting), or both underprinting and overprinting are carried out. The polyvalent metal ions useful for the present invention include $Zn^{2+}$, $Mg^{2+}$, $Ca^{2+}$, $Cu^{2+}$, $Co^{2+}$, $Ni^{2+}$, $Fe^{2+}$, $La^{3+}$, $Nd^{3+}$, $Y^{3+}$ and $Al^{3+}$, although not limited thereto. The preferable anions for binding the above ions include $NO^{3-}$, $F^-$, $Cl^-$, $Br^-$, $I^-$, $CH_3COO^-$ and $SO_4^{2-}$.

Another method for reducing bleeding in the boundary region between color ink and black ink is to incorporate an organic acid in the color ink of the present invention to make pH difference between the inks. Such a color ink can be used for underprinting and/or overprinting to agglomerate the colorant in the black ink and thereby accelerate fixation of the black ink. The preferable organic acids for the present invention include dibasic acids, e.g., oxalic, succinic, malonic, gluconic and adipic acids, formic, acetic and propionic acids.

Alternatively, a second, transparent ink containing a gelling agent for gelling the colorant of the ink of the present invention may be used for underprinting or overprinting to accelerate gelling of the colorant in the ink. The gelling agents useful for the present invention include cationic components, e.g., the polyvalent metal salts described above, organic acids also described above, polyallylamine, polyethyleneimine and benzalconium chloride. The gelling agents useful for the present invention are not limited to the above, and any one may be used so long as it can agglomerate the colorant.

Underprinting or overprinting tends to use ink more, causing more curl of the printed matter. However, curl of a printed medium can be very effectively prevented with a colorant-free gelling solution containing an anti-curl agent of the present invention, as well as the ink containing an anti-curl agent of the present invention.

The ink containing the gelling agent described above may be applied by using an ink jet head, or spread over the entire surface of a recording medium by using a bar coater or a spray coater.

Needless to say, the anti-curl agent of the present invention, when used as an underprinting (preprinting) solution, can exhibit an anti-curl effect for the recording medium if it does not have a function to agglomerate the colorant.

The ink of the present invention, when used for ink jet printing, may contain a surfactant to accelerate ink penetration/fixation to the recording medium, or speed up recording. The surfactant useful for the present invention may be anionic or cationic, but is preferably nonionic in consideration of ink storage stability. More specifically, the preferable surfactants for the present invention are those based on polyoxyethylene alkyl ether, polyoxyethylene alkyl ester, Pluronic type ethylene oxide and propylene oxide, acetylene glycol/ethylene oxide adduct, dimethyl siloxane/ethylene oxide adduct and derivatives thereof, and betaine type alkyl fluoride, of which polyoxyethylene alkyl ether and acetylene glycol/ethylene oxide adduct are more preferable in consideration of storage stability for extended periods and surfactant activity effect.

As discussed in Japanese Patent No. 3,412,857, a structure having a hydrogen added to the amide bond tends to be hydrolyzed by the action of the active hydrogen to generate an alcohol amine such as ethanolamine, causing pH increase. The inventors of the present invention have calculated the relationship between the monoethanolamine content in a solution and pH of the solution using the dissociation constant (K) of monoethanolamine. When the monoethanolamine content was $1.0 \times 10^{-4}$ mol/L, pH was 9.62, and pH 8.90 at $1.0 \times 10^{-5}$ mol/L. Therefore it is also preferable for the present invention to control the content of alcohol amine derived from the starting material, and to control pH of the solution, to repress amine activity.

The present invention is particularly effective for a recording medium of a sheet-type plain paper. The plain paper includes those commercially available papers such as copy paper, recycled copy paper, plain paper for ink jet printing, plain paper for color ink jet printing, plain paper for ink jet/electrophotographic printing, and Japanese paper, including those not coated with a special white pigment on the surface, or lightly coated ones partly exposing pulp fibers of the base paper.

The present invention is particularly suitable for the ink jet recording method, which ejects ink droplets onto a recording medium utilizing thermal energy. However, the present invention is also applicable to other ink jet printing systems or writing utensils.

A recording apparatus suitable for recording with the ink of the present invention ejects ink droplets by applying thermal energy to the ink held in the recording head in accordance with the recording signals.

FIG. 1 is an oblique view of an example ink jet printer having a liquid-ejecting head of a stem where a bubble formed in the liquid communicates with the atmosphere to eject a droplet, where, 1006: movement-driving unit, 1008: casing, 1010: recording unit, 1010*a*: carriage member, 1012: cartridge, 1012 Y, M, C and B: cartridges for respective colors, 1014: scanning rail, 1016: belt, 1018: motor, 1020: driving unit, 1022*a* and 1022*b*: roller units, 1024*a* and 1024*b*: roller units, 1026: recovery unit, 1026*a* and 1026*b*: pulleys, 1028: recording paper, and 1030: conveying unit.

Referring to FIG. 1, in the ink jet printer, the conveying unit 1030 is held in the longitudinal direction in the casing 1008 and intermittently conveys a recording medium or paper 1028 in the direction of arrow P shown in FIG. 1; recording unit 1010 is reciprocally moved almost in parallel to the direction S along the scanning rail 1014 which is almost orthogonal to the direction P, and movable driving unit 1006 as a driving means for reciprocally moving the recording unit 1010.

The conveying unit 1030 comprises two pairs of the roller units 1022*a* and 1022*b* and 1024*a* and 1024*b* facing each other and the driving unit 1020 which drives each of the roller units. When the driving unit 1020 is on, the conveying unit intermittently conveys the paper 1028 in the direction P shown in FIG. 1 holding the paper 1028 between the roller units 1022*a* and 1022*b*, and 1024*a* and 1024*b*.

The movement-driving unit 1006 comprises the belt 1016 wound around each of the pulleys 1026*a* and 1026*b* on each of rotational shafts facing each other at a given distance, and the motor 1018 which drives the belt 1016 in both directions which is connected to the carriage member 1010*a* of the recording unit 1010 and positioned almost in parallel to the roller units 1022*a* and 1022*b*.

When the motor 1018 is started and the belt 1016 is rotated in the direction of arrow R, the carriage member 1010*a* of the recording unit 1010 moves by a given distance in the direction of arrow S shown in FIG. 1. When the belt 1016 is rotated in the direction reverse to the arrow R by the motor 1018, the carriage member 1010*a* of the recording unit 1010 moves by a given distance in the direction reverse to the arrow S. Moreover, near one end of the movement-driving unit 1006, a recovery unit 1026 is provided at a home position for the carriage member 1010*a* as discharge-recovering means for the recording unit 1010. The recovery unit 1026 is positioned to face the ink eject ports of the recording unit 1010.

The recording unit 1010 is provided with the ink jet cartridges (hereinafter sometimes referred to as merely cartridge) 1012Y, 1012M, 1012C and 1012B for respective colors, e.g., yellow, magenta, cyan and black, which can be freely attached to or detached from the carriage member 1010*a*.

Figure 2:
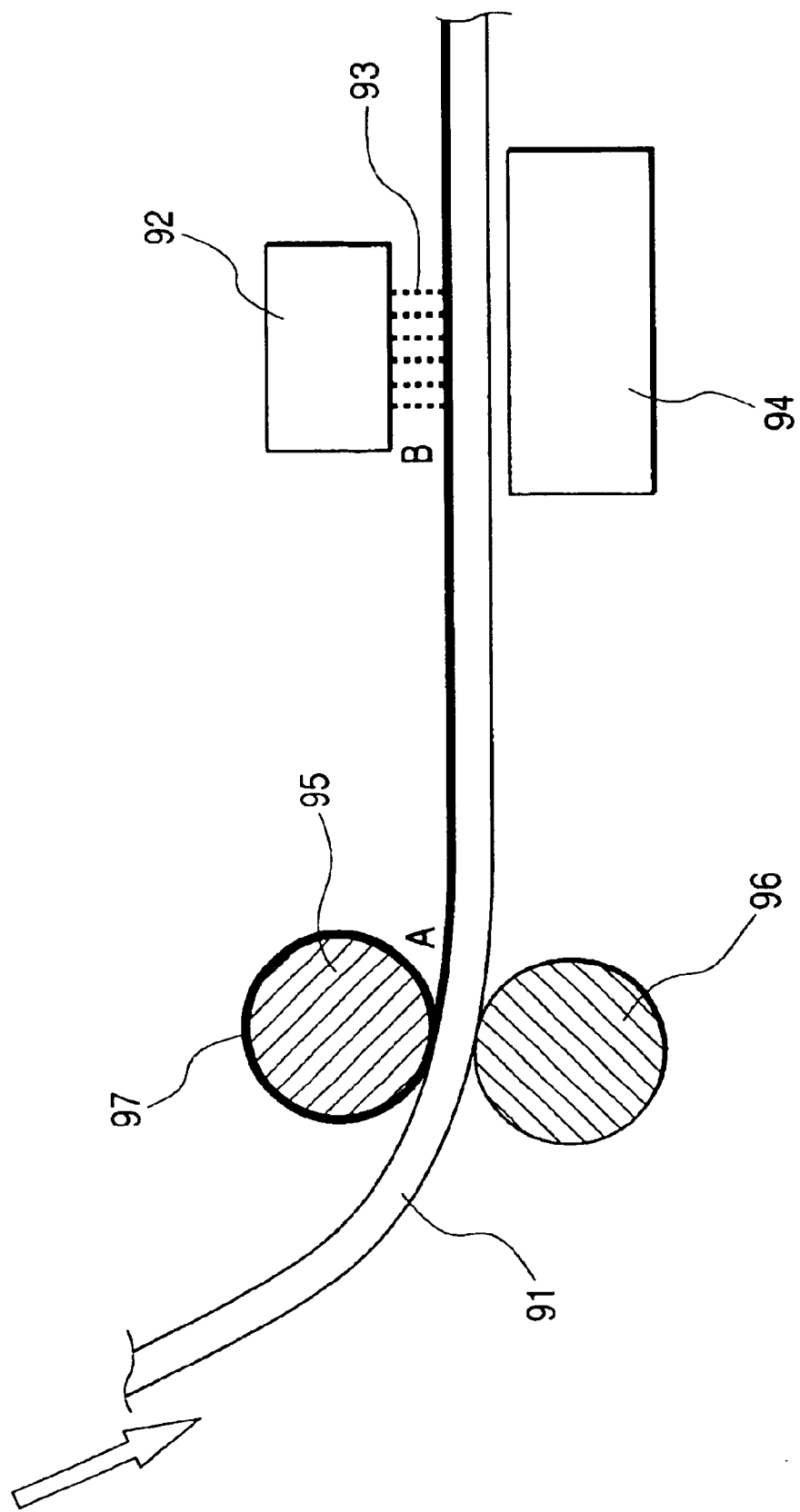
FIG. 2 is a schematic cross-sectional view of the major part of a recording apparatus to use the anti-curl agent of the present invention as an underprinting agent.

FIG. 2 schematically illustrates a cross-sectional view of the main part of a recording apparatus which uses the anti-curl agent of the present invention as an underprinting (preprinting) agent, where numeral 91 designates recording medium, 92: recording head, 93: printing ink, 94: platen, 95: coating roller, 96: conveying roller and 97: anti-curl agent of the present invention.

Referring to FIG. 2, the recording medium 91 is plain paper, and is moved in the direction of the arrow, which indicates the paper-conveying passage in the recording apparatus. The recording head 92, which is provided in the recording apparatus, is for printing images by scanning in the direction perpendicular to the conveyance direction of the recording medium 91. In this figure, the printing ink 93 is now ejected onto the paper surface. The platen 94 is provided at the opposite side of the ejected ink 93 across the recording medium 91 to stably hold the recording medium 91 being printed with the ejected ink.

The anti-curl agent of the present invention is applied at the position A shown in FIG. 2.

The coating roller 95, provided in the passage of the recording medium, transfers and spreads an anti-curl agent over the recording medium 91, making a pair with the paper-conveying roller 96 to hold the recording medium 91 in-between. The conveying roller 96 may be used as a device dedicated for pressurizing the coating roller 95. Other rollers (pinch roller, spur or the like) necessary for stably holding the recording medium 91 while an image is being formed thereon are not shown in FIG. 2.

While the paper conveying roller 96 conveys the recording medium 91, anti-curl agent 97 supplied almost uniformly onto the coating roller 95 by an anti-curl agent supply means (not shown) is transferred to the recording medium. The anti-curl agent 97 is uniformly transferred onto the recording medium 91 under a pressure generated by the coating roller 95 and the paper-conveying roller 96.

The anti-curl agent supply means (not shown) is not limited. It may be selected, as required, from various embodiments, e.g., means for supplying the agent from its storage tank onto the coating roller 95, or for supplying the agent from an absorbent impregnated with the agent onto the coating roller 95.

Moreover, the means for transferring the anti-curl agent onto the recording medium 91 using the coating roller 95 is not limited to the above. It may be selected, as required, from various embodiments, e.g., means for transferring the agent from its storage tank onto the recording medium 91 by a rubber-like spatula, or transferring the agent from an absorbent impregnated with the agent onto the recording medium 91.

The recording medium 91, after being coated with the anti-curl agent 97 of the present invention, is printed with the printing ink 93 dejected from the recording head 92 at the position B shown in FIG. 2.

The present invention is described in more detail by the Examples. Table 2 summarizes the materials used in the Examples and the Comparative Examples, where "part(s)" means part(s) by mass. Water used was pure water produced by ultrafiltration, ion-exchanging with resin or the like.

EXAMPLES

Example 1

The compounds for Example 1 given in Table 2 were mixed and filtered by using a membrane filter (pore size: 0.2 μm) to prepare the ink of Example 1. Examples 2 to 11, Comparative Examples 1 and 2

Inks of Examples 2 to 11, and Comparative Examples 1 and 2 were prepared in the same manner as in Example 1, using the compounds given in Table 2.

Example 12
(Preparation of Yellow Ink)

A styrene/acrylic acid copolymer (Joncryl 678, Johnson Polymer), potassium hydroxide of an amount necessary for neutralizing the copolymer and water were mixed. The resulting mixture was stirred for mixing while it was kept at around 60° C., to prepare a 10% aqueous solution of styrene/acrylic acid copolymer.

Next, the mixture was incorporated with the following components and stirred for 30 minutes, and then dispersion-treated under the following conditions.

| | |
|---|---|
| 10% Aqueous solution of styrene/acrylic acid copolymer | 30 parts |
| Pigment Yellow 74 | 10 parts |
| Ion-exchanged water | 60 parts |

Dispersing machine: Sand grinder (Imex)
Milling medium: Zirconium beads (diameter: 1 mm)
Filling ratio of milling medium: 50% by volume
Milling time: 3 hours The mixture was centrifuged at 12,000 rpm for 20 minutes to remove coarse particles and a dispersion solution was prepared.

Pigment-containing Example 12-Y ink was prepared by mixing the following composition in the same manner as in Example 1, except that the above pigment dispersion solution was used.

| | |
|---|---|
| Pigment dispersion solution, described above | 30 parts |
| Glycerin | 3 parts |
| Diethylene glycol | 10 parts |
| Example compound 6 | 8 parts |
| Acetylenol | 0.5 parts |
| Ion-exchanged water | 48.5 parts |

(Preparation of Magenta Ink)

Example 12-M ink (magenta ink) was prepared in the same manner as the Example 12-Y ink, except that Pigment Yellow 74 was replaced by Pigment Red 122.

(Preparation of Cyan Ink)

Example 12-C ink (cyan ink) was prepared in the same manner as in Example 12 for the yellow ink, except that Pigment Yellow 74 was replaced by Pigment Blue 15:3.

(Preparation of Black Ink)

Example 12-Bk ink (black ink) was prepared in the same manner as the Example 12-Y ink, except that Pigment Yellow 74 was replaced by carbon black (Carbon black #960, Mitsubishi Chemical).

As described above, an ink set of yellow, magenta, cyan and black inks was prepared in Example 12.

TABLE 2

| | Anticurling agent (Example compound No.) | A | DEG | 1,6-HDIPA | IPA | Mg(NO$_3$)$_2$ | Colorant | GLY | Urea | AceEH | Water |
|---|---|---|---|---|---|---|---|---|---|---|---|
| Example 1 | 3 | 8 | 10 | 0 | 4 | 0 | 3(*1) | 0 | 0 | 0.5 | 74.5 |
| Example 2 | 3 | 8 | 10 | 0 | 4 | 0 | 3(*1) | 0 | 0 | 0.5 | 74.5 |
| Example 3 | 3 | 8 | 10 | 10 | 4 | 0 | 3(*1) | 0 | 0 | 0.5 | 74.5 |
| Example 4 | 2 | 8 | 10 | 0 | 4 | 0 | 3(*1) | 0 | 0 | 0.5 | 74.5 |
| Example 5 | 1 | 8 | 10 | 0 | 4 | 0 | 3(*1) | 0 | 0 | 0.5 | 74.5 |
| Example 6 | 4 | 8 | 0 | 10 | 4 | 2 | 3(*1) | 0 | 0 | 0.5 | 72.5 |
| Example 7 | 5 | 8 | 0 | 0 | 0 | 0 | 4.5(*2) | 3 | 10 | 0.5 | 74.0 |
| Example 8 | 6 | 8 | 0 | 0 | 0 | 0 | 4.5(*2) | 3 | 10 | 0.5 | 74.0 |
| Example 9 | 7 | 8 | 0 | 0 | 0 | 0 | 4.5(*2) | 3 | 10 | 0.5 | 74.0 |
| Example 10 | 8 | 8 | 0 | 0 | 0 | 0 | 4.5(*2) | 3 | 10 | 0.5 | 74.0 |
| Example 11-Y | 6 | 8 | 0 | 0 | 0 | 0 | 4.5(*1) | 3 | 10 | 0.5 | 74.0 |
| Example 11-M | 6 | 8 | 0 | 0 | 0 | 0 | 4.5(*3) | 3 | 10 | 0.5 | 74.0 |
| Example 11-Bk | 6 | 8 | 0 | 0 | 0 | 0 | 4.5(*4) | 3 | 10 | 0.5 | 74.0 |
| Example 12-Y | 6 | 8 | 10 | 0 | 0 | 0 | 30(*5) | 3 | 0 | 0.5 | 49.5 |
| Example 12-M | 6 | 8 | 10 | 0 | 0 | 0 | 30(*6) | 3 | 0 | 0.5 | 49.5 |

TABLE 2-continued

| | Anticurling agent (Example compound No.) | A | DEG | 1,6-HDIPA | IPA | Mg(NO$_3$)$_2$ | Colorant | GLY | Urea | AceEH | Water |
|---|---|---|---|---|---|---|---|---|---|---|---|
| Example 12-C | 6 | 8 | 10 | 0 | 0 | 0 | 30(*7) | 3 | 0 | 0.5 | 49.5 |
| Example 12-Bk | 6 | 8 | 10 | 0 | 0 | 0 | 30(*8) | 3 | 0 | 0.5 | 49.5 |
| Comparative Example 1 | — | 0 | 10 | 0 | 4 | 0 | 3(*1) | 0 | 0 | 0.5 | 82.5 |
| Comparative Example 2 | — | 0 | 0 | 0 | 0 | 0 | 4.5(*2) | 3 | 10 | 0.5 | 82.0 |

A: Anticurling agent
DEG: Diethylene glycol
1,6-HD: 1,6-Hexanediol
IPA: Isopropyl alcohol
(*1): Yellow dye [Acid yellow-23 (Daiwa Kasei)]
(*2): Cyan dye [Direct blue 199 (Avesia)]
(*3): Magenta dye [Project Fast Magenta II (Avesia)]
(*4): Black dye [Direct black 19 (Nippon Kayaku)]
(*5): Pigment yellow 74 dispersion
(*6): Pigment red 122 dispersion
(*7): Pigment blue 15:3 dispersion
(*8): Carbon black dispersion
GLY: Glycerin Ace-EH:
Acetylenol EH (Kawaken Fine Chemicals)
Water: Ion-exchanged water <Evaluation>

The ink prepared in each of the Examples and the Comparative Examples was used for printing a plain paper (A4 size) on the entire surface, except for a 3 cm margin from each edge, at a printing duty of 100%, by using the following two types of ink jet printers. The results are given in Table 3.

Printer 1: Ink jet printer BJC465J color head (360 dpi×360 dpi, Ejection rate: 25 pl), Canon Inc.

Printer 2: Ink jet printer BJF850 (1200 dpi×1200 dpi, Ejection rate: 4.5 pl), Canon Inc.

(Evaluation 1)

Curl degree of the recording medium printed under the above-described conditions was evaluated by the following procedure. The printed medium was left under the conditions of 23° C. and 60%±5% RH for 7 days after printing, and curl extent (vertical distance from the table on which the paper was placed to each of the four corners) at the four corners of the medium was measured, to calculate the average. The recording media were NSK paper (Canon) and XEROX4024 (XEROX Corp.), both A4 in size. The medium was placed on a table with the printed surface upward. Curl is normally referred to as being positive when the medium is curved concave upward, and negative when it was curved convex. All the printed matters prepared with Examples and Comparative Example inks curled positive.

Curl extent was evaluated according to the following standards:

A . . . Curl extent: less than 20 mm
B . . . Curl extent: 20 mm or more but less than 35 mm
C . . . Curl extent: 35 mm or more (Evaluation 2)

Each solid image formed on the entire surface was visually observed, to evaluate image uniformity according to the following standards:

A . . . The image is uniform, free of blurring or lines
B . . . The image is not uniform to some extent, with some blurring or lines
C . . . The image is not uniform, with notable blurring or lines (Evaluation 3)

Alphanumeric and solid images were continuously formed on the entire surfaces of total of 50 sheets, and subjected to sensory inspection for image quality, to evaluate ink ejecting stability according to the following standards, where the sheet was A4 NSK paper (Canon Inc.)

A . . . No significant difference is present between the image on the first sheet and that on the last sheet with respect to ink concentration and clearness
B . . . The image on the last sheet is a little inferior to that on the first sheet to some extent with respect to ink concentration and clearness
C . . . The image on the last sheet is low in ink concentration and has disordered dots as compared with that on the first sheet (Evaluation 4)

Ink stability was evaluated by observing whether or not the ink caused problems in printing, e.g., nozzle clogging. The ink prepared in each of Examples and Comparative Examples was used for printing alphanumeric and solid images over the entire surface of the recording medium after the ink had been left in a printer head for 1 month, to observe whether the images had a disordered or blurred portion. Recovery of the ink from solidification was evaluated by the following standards:

A . . . The image shows no blurring.
B . . . The image shows blurring to some extent.
C . . . The image shows blurring or no ink ejection.

TABLE 3

| | Anticurling | Evaluation 1 | Evaluation 1 |
|---|---|---|---|

| | Printer | agent (Example compound No.) | (one day after) N-SK | (one day after) XX4024 | (7 days after) N-SK | (7 days after) XX4024 | Evaluation 2 | Evaluation 3 | Evaluation 4 |
|---|---|---|---|---|---|---|---|---|---|
| Example 1 | 1 | 3 | A | A | B | B | A | A | A |
| Example 2 | 2 | 3 | A | A | A | A | A | A | A |
| Example 3 | 1 | 3 | A | A | A | A | A | A | A |
| Example 4 | 1 | 2 | A | A | B | B | A | A | A |
| Example 5 | 1 | 1 | A | A | B | B | A | A | A |
| Example 6 | 1 | 4 | A | A | B | B | B | B | B |
| Example 7 | 2 | 5 | A | A | B | B | A | A | A |
| Example 8 | 2 | 6 | A | A | B | B | A | A | A |
| Example 9 | 2 | 7 | A | A | B | B | B | B | B |
| Example 10 | 2 | 8 | A | A | B | B | B | B | B |
| Example 11-Y | 2 | 6 | A | A | B | B | A | A | A |
| Example 11-M | 2 | 6 | A | A | B | B | A | A | A |
| Example 11-Bk | 2 | 6 | A | A | B | B | A | A | A |
| Example 12-Y | 2 | 6 | A | A | B | B | A | A | A |
| Example 12-M | 2 | 6 | A | A | B | B | A | A | A |
| Example 12-C | 2 | 6 | A | A | B | B | A | A | A |
| Example 12-Bk | 2 | 6 | A | A | B | B | A | A | A |
| Comparative Example 1 | 1 | — | C | C | C | C | A | A | C |
| Comparative Example 2 | 2 | — | C | C | C | C | B | B | C |

What is claimed is:

1. An ink jet ink comprising:
   a colorant;
   an aqueous medium; and
   an amide compound which has a structure selected from the group consisting of the general formulae (a) and (b) described below, and a molecular weight below 1000:

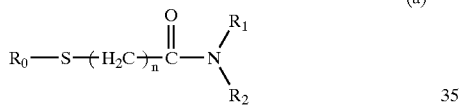

(a)

wherein, n is 1; $R_0$ is a linear or branched alkanol group of 2 to 4 carbon atoms, $-(CH_2)_{m1}COOH$ where m1 is 2 or 3, $-(CH_2)_{m2}SO_3Na$ where m2 is 2 or 3 or $-(CH_2)_{m3}SO_3H$ where m3 is 2 or 3; and $R_1$ and $R_2$ are each independently a hydrogen atom or a linear or branched alkanol group of 2 to 4 carbon atoms, substituted with a hydrogen atom or hydroxyl group, where $R_1$ and $R_2$ are not a hydrogen atom simultaneously, and

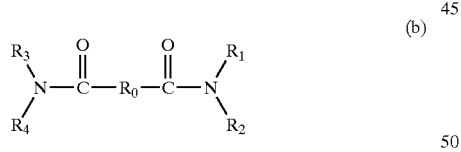

(b)

wherein, $R_0$ is phenylene, ethylene, propylene, butylene or cyclohexylene group; and $R_1$ to $R_4$ are each independently a hydrogen atom, a linear or branched alkanol group of 2 to 4 carbon atoms or $-(CH_2CH_2O)_nH$ where n is an integer of 1 to 5, where $R_1$ and $R_2$ are not a hydrogen atom simultaneously, and $R_3$ and $R_4$ are not a hydrogen atom simultaneously.

2. The ink according to claim 1, wherein said amide compound is represented by the general formula (a).

3. The ink according to claim 1, wherein said amide compound is represented by the general formula (b).

4. A method for ink jet recording, comprising at least a step of ejecting an ink according to claim 1 by an ink jet method.

5. A method for reducing curl of a recording medium by applying an ink according to claim 1 to a recording medium by ejecting the ink by an ink jet method.

* * * * *